United States Patent [19]

Zumbahlen

[11] 4,212,254

[45] * Jul. 15, 1980

[54] TILLER PLANTER WITH MODIFIED SEED BED FINISHING IMPLEMENT

[76] Inventor: Vincent J. Zumbahlen, Newton, Ill.

[ * ] Notice: The portion of the term of this patent subsequent to Sep. 20, 1994, has been disclaimed.

[21] Appl. No.: 834,191

[22] Filed: Sep. 19, 1977

Related U.S. Application Data

[63] Continuation-in-part of Ser. No. 647,655, Jan. 8, 1976, Pat. No. 4,048,929.

[51] Int. Cl.² .......................... A01C 5/00; A01C 5/08
[52] U.S. Cl. ........................................ 111/52; 111/85; 172/142; 172/146; 172/177; 172/200
[58] Field of Search ................ 111/52, 14, 61, 62, 111/6, 63, 85, 70, 1, 8; 172/68, 142, 145, 532, 548, 552, 553, 27, 28, 121, 133, 146, 147, 148, 149, 150, 175, 537, 177, 200 3

[56] References Cited

U.S. PATENT DOCUMENTS

| | | | |
|---|---|---|---|
| 633,750 | 9/1899 | Aucoin | 172/552 X |
| 799,399 | 9/1905 | Naylor | 172/142 X |
| 1,017,383 | 2/1912 | Christenson | 172/548 X |
| 1,301,043 | 4/1919 | Dougherty | 172/121 X |
| 1,371,012 | 3/1921 | Williams | 111/14 |
| 1,930,850 | 10/1933 | Colca | 172/146 X |
| 2,066,610 | 1/1937 | Carlin | 111/14 |
| 2,455,147 | 11/1948 | Traver | 172/146 X |
| 2,577,363 | 12/1951 | Porynor | 111/63 |
| 3,110,275 | 11/1963 | Bonney | 111/70 |
| 3,128,833 | 4/1964 | Johnson et al. | 111/85 X |
| 3,170,421 | 2/1965 | Norris et al. | 111/85 X |
| 3,175,522 | 3/1965 | Garber et al. | 111/61 |
| 3,314,386 | 8/1967 | Kopaska | 172/142 X |
| 3,335,681 | 8/1967 | Main et al. | 111/61 X |
| 3,340,934 | 9/1967 | Wycoff | 111/71 X |
| 3,372,657 | 3/1968 | Hansen | 111/62 X |
| 3,543,704 | 8/1968 | Hansen et al. | 111/52 |
| 3,635,495 | 1/1972 | Orendorff | 111/85 X |
| 3,701,327 | 10/1972 | Krumholz | 111/85 X |
| 3,742,877 | 7/1973 | Coffee | 111/6 |
| 3,749,035 | 7/1973 | Cayton et al. | 111/85 |
| 3,799,079 | 3/1974 | Dietrich | 172/145 X |
| 3,810,434 | 5/1974 | Van Der Lely et al. | 172/552 X |
| 3,899,030 | 8/1975 | Van Der Lely et al. | 172/552 X |
| 4,048,929 | 9/1977 | Zumbahlen | 111/70 |
| 4,068,724 | 1/1978 | Van Der Lely | 172/552 |
| 4,103,628 | 8/1978 | Gaston | 111/52 |

FOREIGN PATENT DOCUMENTS

| | | | |
|---|---|---|---|
| 404889 | 1/1923 | Fed. Rep. of Germany | 111/85 |
| 999134 | 1/1952 | France | 111/1 |
| 321384 | 10/1934 | Italy . | |
| 135098 | 11/1919 | United Kingdom | 172/149 |
| 1217473 | 12/1970 | United Kingdom | 111/85 |

*Primary Examiner*—Clifford D. Crowder
*Assistant Examiner*—James R. Feyrer
*Attorney, Agent, or Firm*—Cook, Wetzel & Egan, Ltd.

[57] ABSTRACT

A tractor-drawn machine adapted to perform tilling, seed bed preparation, and planting in a single operation, comprises a frame from which plow units, a reel unit, a seed bed finishing implement and seed planting units are mounted seriatim. The attitude of the frame may be adjusted during operation in that the operator of the tractor is able to independently adjust the elevation of both the front of the frame and the rear of the frame.

15 Claims, 9 Drawing Figures

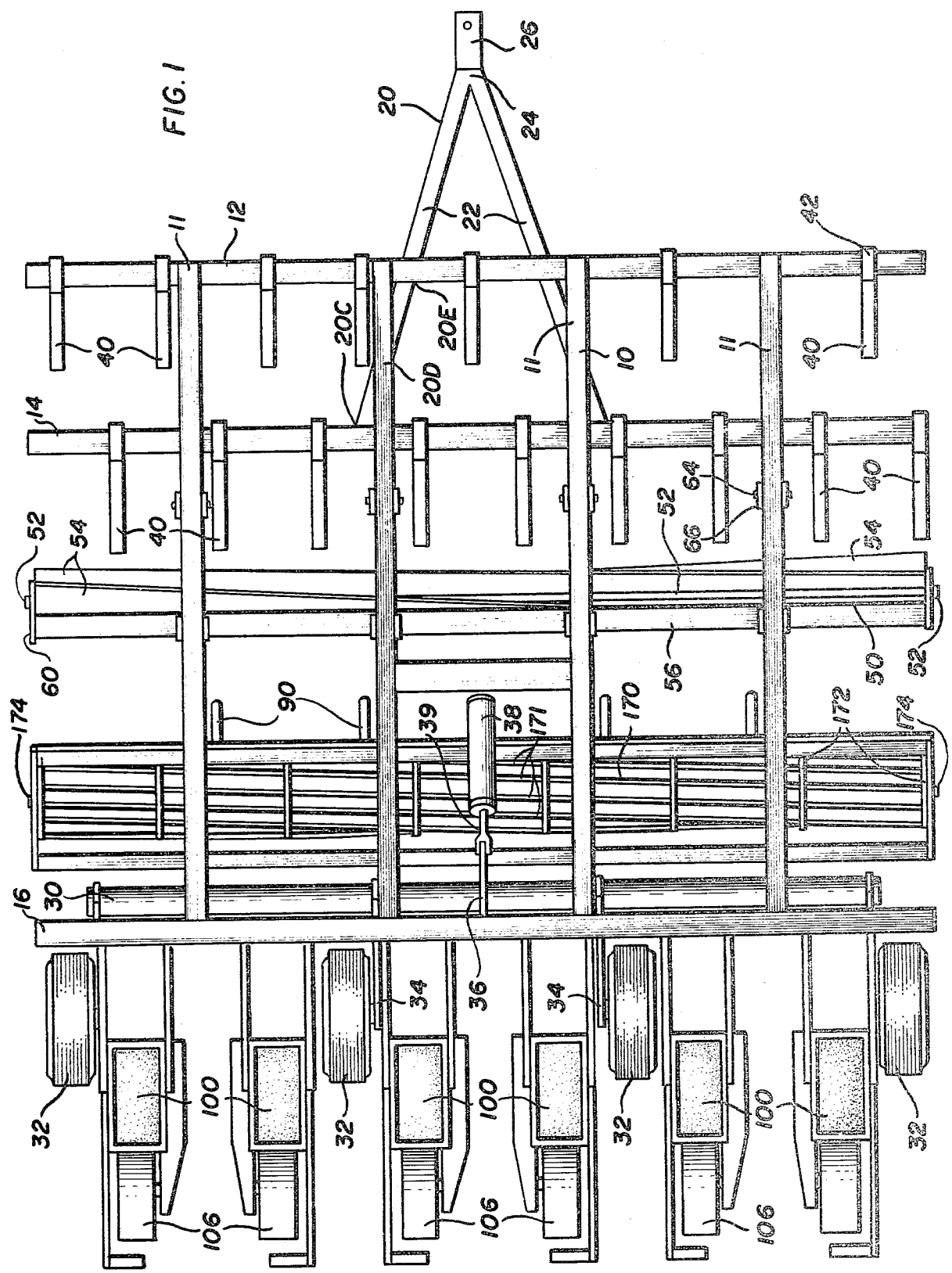

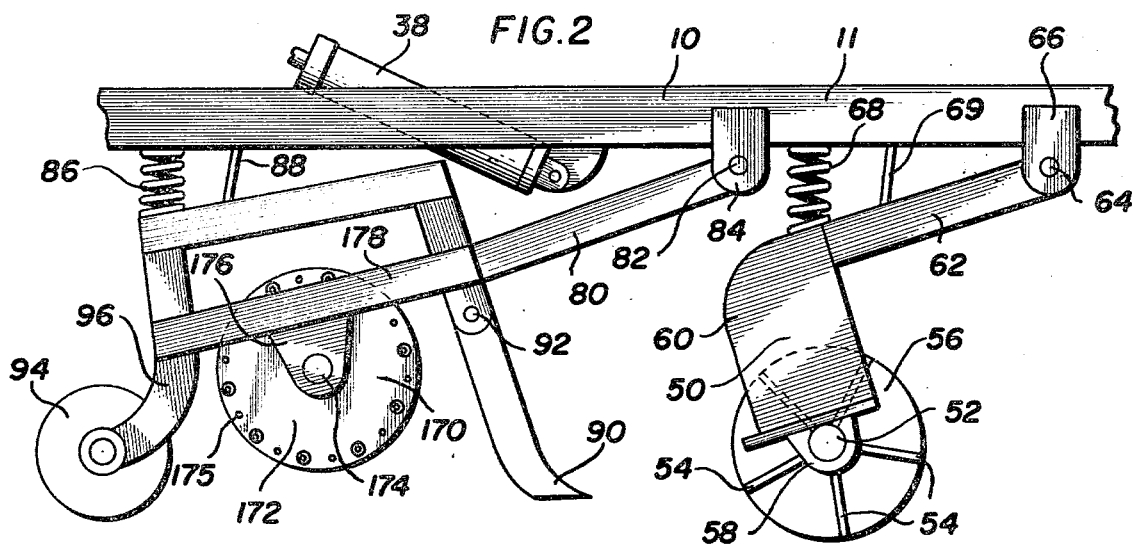
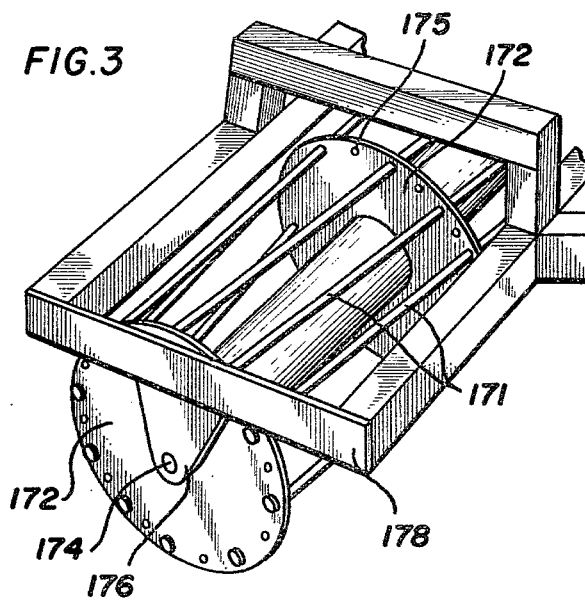
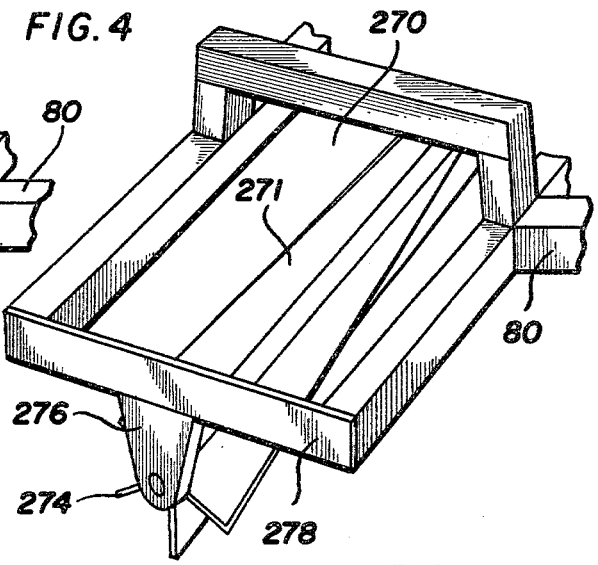
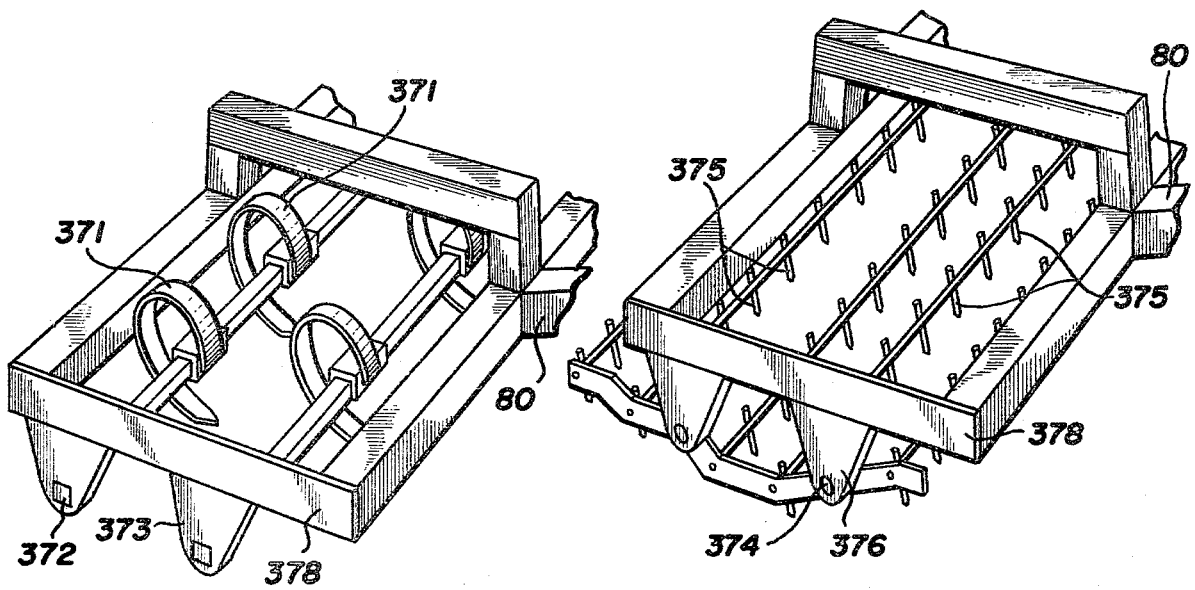

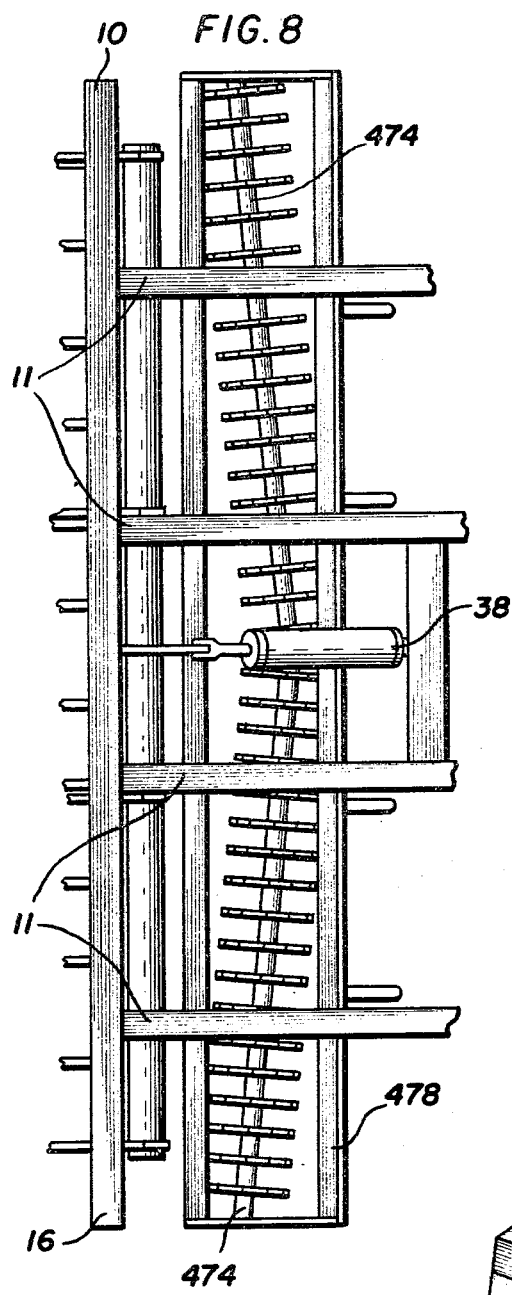
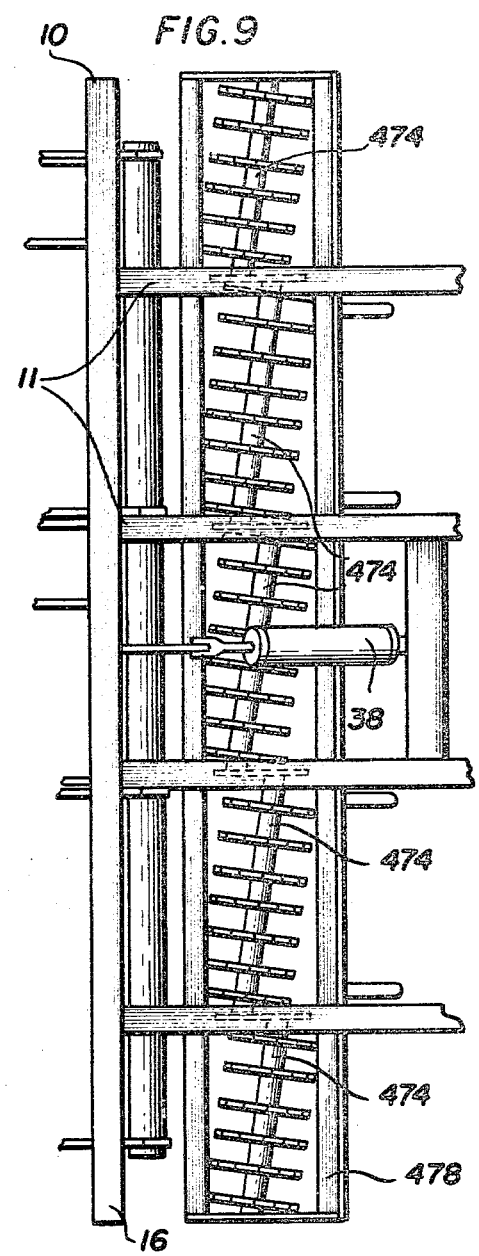
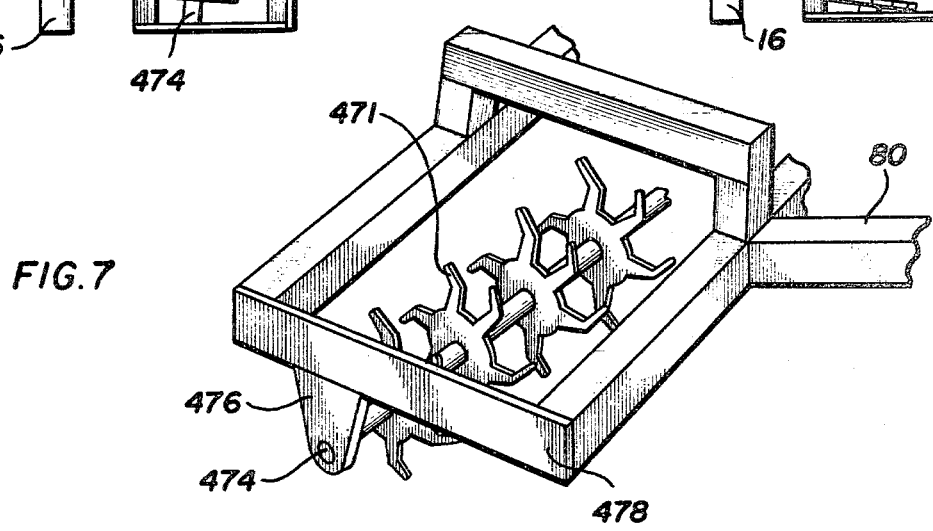

TILLER PLANTER WITH MODIFIED SEED BED FINISHING IMPLEMENT

This application is a continuation-in-part of application Ser. No. 647,655 filed Jan. 8, 1976, now U.S. Pat. No. 4,048,929.

The above-identified parent patent relates broadly to an apparatus which will till a field, prepare a seed bed, and plant desired crop in a single pass through a field. This application relates to an improved apparatus which will till a field, prepare a seed bed and plant a desired crop in a single pass through a field under a wider variety of field and soil conditions. The present improvement invention includes several embodiments which are particularly suitable to use in certain field or soil conditions, and which give a farmer added flexibility with respect to cultivation of fields having different soil conditions. The apparatus is also adapted to apply one or more types of fertilizer and/or herbicides in the same trip through the field.

BACKGROUND OF THE INVENTION

Conventional methods of crop farming require that a field to be planted is first plowed, then harrowed, then raked and then planted and then cultivated. Additional operations such as fertilizing, applying herbicide, discing and the like require additional trips to the field. Normally each operation requires a separate pass over the field by a tractor towing appropriate equipment, thereby requiring as many as six passes over a field to raise a single crop. Obviously, the conventional technique requires the expenditure of great amount of time on the part of the farmer, as well as a great expenditure of money in terms of fuel and energy involved in the multiple passes through the field.

The prior art has proposed different types of apparatus and different methods by which more than one of the foregoing operations could be accomplished in a single pass. Such prior art includes U.S. Pat. No. 2,577,363 and U.S. Pat. No. 3,110,275 and U.S. Pat. No. 3,372,657, all of which describe apparatus and methods to accomplish some tillage in combination with the planting operation. Other combinations of apparatus have been assembled, but none of the prior art devices have achieved commercial adoption.

Applicant's parent application Ser. No. 647,655 filed Jan. 8, 1976, now U.S. Pat. No. 4,048,929, describes the basic machine for tilling and planting the surface of a field, wherein the machine comprises a frame adapted to be drawn across a field by a prime mover tractor wherein the longitudinal attitude of the frame can be adjusted by the operator of the tractor, in order to permit the elevation of the front of the frame to be independently adjusted with respect to the elevation of the rear of the frame. Further, conventional implements are mounted on the frame in a required order, to wit: a plow unit is mounted on the forward portion of the frame, followed by a reel unit which is flexibly mounted below the frame, followed by a seed bed finishing implement, e.g., a roller unit, flexibly mounted below the frame to the rear of the reel unit, followed by a seed planting unit mounted on the rear of the main frame in such a manner that the seed planting unit is raised when the rear of the main frame is elevated.

SUMMARY OF THE INVENTION

The present invention is an improvement invention which provides an apparatus having added flexibility which is adapted to (a) plow the field to the desired depth, (b) pulverize and level the plowed soil, (c) is desired, inject fertilizer to the desired depth and at the desired spacing, (d) further pulverize and/or compact (if necessary) the leveled soil in order to complete the seed bed preparation, and (e) plant the desired seeds, including opening the seed bed, injecting the seed, and covering the planted seed with loose soil. The apparatus of the present invention accomplishes all of these operations in a single pass through the field, which results in savings of a great deal of time and much tractor time, fuel and expense. The present invention accomplishes all of these operations, but provides for additional flexibility in varying the seed bed finishing implement with a number of different implements or implement combinations. By employing the modified device of the present invention, the basic apparatus can be used in a wide variety and differing combinations of soils and in fields. Further, the present invention contemplates the use of seed bed finishing implements which may be readily changed back and forth, even under field conditions, to accommodate the different field conditions or soil conditions which are encountered in cultivating many larger farms.

The present invention comprises a rigid frame which is tractor drawn, and conventional type tillage units, seed bed preparation units, and planter units which are mounted on the rigid frame. The longitudinal attitude of the frame is adjustable, during the operation in the field, as the frame is being drawn through the field.

For the purposes of the present invention, it is deemed essential that each of the individual units may be adjusted as to elevation or height and with respect to soil penetration. In the preferred embodiment, the elevational adjustment is effectively accomplished through the use of a frame which is adjustable with respect to elevation, whereby the rear of the frame and the front of the frame are independently and separately controllable by the operator as to elevation or height above the soil during movement through the field. The separate control of the elevation of the front of the frame and the rear of the frame with respect to the field or ground level in general, is essential, as is more fully explained below.

The forward portion of the frame may be adjusted with respect to elevation either by attaching the frame to a conventional three-point hitch on a tractor used as the prime mover to pull the frame through the field, or alternatively, the frame may be attached to a static hitch, in which case the forward portion of the frame must be equipped with a mechanism which permits elevational adjustment of the forward portion of the frame during operation of the apparatus.

The rear portion of the frame is preferably adjusted by a hydraulic system which controls the height of a plurality of support wheels mounted at the rear of the frame.

The frame of the present invention is equipped with several tool units which are essential to the operation. Those tools which are considered to be essential include a plurality of chisel plows, a pluverizing reel, a seed bed finishing implement, and the planting units.

The chisel plows are mounted on one or more conventional horizontal tool bars which are disposed at the forward portion of the main frame. Although all of the chisel plows may be mounted on a single tool bar, it is generally preferred to use more than one tool bar with the chisel plows laterally offset from each other in order to avoid the accumulation of trash in the plows. It has been found that good results are obtained by mounting the chisel plows with 8 or 9 inch spacing between each chisel plow. Thus, if two tool bars are used, each tool bar will have a chisel plow mounted thereon at approximately 16 to 18 inch intervals. More than two tool bars for mounting chisel plows may be employed if desired. Generally, it is preferred to have the tool bars for mounting the chisel plow longitudinally spaced at about 30 inches, as measured from the front tool bar to the rear tool bar. This facilitates the passage for large trash through the plow section of the apparatus.

As will be apparent to those skilled in the art, the conventional chisel plows used in the present invention may be equipped with various types of standard tips, depending upon the type of soil being plowed, the moisture conditions, the speed at which the tilling and planting operation is to take place and other variables. It is preferred to use spring loaded chisel plows of conventional design, although they are more expensive than the directly attached plows. Basically, the depth at which the plows are set will be a function of the type of soil desired, the moisture on the field at the time of the operation, and other variables known to the art.

The next essential piece of conventional equipment is the reel unit which is mounted on the main frame to the rear of the chisel plows. The fundamental purpose of the reel is to break up the large pieces of dirt which are thrown up by the chisel plows, to pulverize the dirt and to level the ground following the plow units. Additionally, the reel units are adapted to mix the trash into the surface dirt which provides a seed bed with improved moisture absorption and improved moisture retention when planted. Further, the reel unit is adapted to knock the dirt off the roots of the weeds uprooted by the plows so that the weeds will die, thus reducing the need for the application of herbicides.

The reel unit is preferably mounted on the rear of the chisel plows from rearwardly extending arms which are pivotally attached to the main frame. The reel unit is then biased downwardly preferably by a spring means. The extent of the downward travel of the reel unit is limited and controlled by chains or other limiting devices.

The next essential tool unit is the seed bed finishing implement which is mounted on the main frame to the rear of the reel. It is preferred that the seed bed finishing implement be mounted on rearwardly extending arms which are pivotally attached to the main frame ahead of the location of the seed bed finishing implement. Similar to the reel, the seed bed finishing implement is preferably biased downwardly by a spring means and the extent of the downward movement of the seed bed finishing implement is controlled by limiting devices such as chains or bracket means. The mounting by which the seed bed finishing implement is attached to the main frame may conveniently serve as the mounting base for liquid fertilizer injection knives and/or furrowing devices, if a crop is to be planted in or on furrows.

The particular form of the seed bed finishing implement employed may be varied considerably. The parent application described the seed bed finishing implement as including conventional corrugated rollers, various commercial variations thereon such as crow foot rollers, sparrow rollers, and flexible or self-cleaning rollers. The present invention contemplates the use of other seed bed finishing implements including (a) a rod roller, (b) a second reel, (c) a harrow, or (d) a spider wheel cultivator.

With respect to the seed bed finishing implement choosen, it is contemplated that a skilled farmer will be able to choose the implement which performs best for him, under the soil conditions and field conditions encountered. In some cases an implement adapted to further break up and subdivide the soil particles such as a harrow will be the most desirable implement, in other cases a seed bed finishing implement which accomplishes some subdivision of particles and some compacting such as the rod roller will be most desirable. While the implements described herein may be equivalent with respect to certain field and/or soil conditions, those skilled in the art will be aware that some differences in operation and results will occur depending upon which implement is employed.

Various types of rod rollers may be used by simply substituting a rod roller for the roller of the type described in parent application Ser. No. 647,655. The rod rollers which may be used may be of relatively simple design, wherein the rods are welded or otherwise affixed to circular support members, located at the ends and at various intermediate locations, mounted on an axle, and wherein the rods are helically positioned about the axle. It is preferred, however, at least a portion of the rods be removable from the roller in order to effectively change the relative level of compaction which occurs as the roller moves to the field. Alternatively, the rod rollers of the type described in U.S. Pat. Nos. 3,885,632; 3,910,356; and 4,006,781 may be used.

As a second embodiment, the bed finishing implement comprises a second reel unit. As is pointed out in the parent application Ser. No. 647,655, under some conditions a second reel may be substituted for the roller. The second reel unit may be essentially identical to the first reel unit, or alternatively, it may differ somewhat in either size or shape, or mounting arrangement, the purpose being to complete the break-up and the pulverization of the soil as well as the leveling and compaction of the seed bed.

As a third embodiment, the seed bed finishing implement comprises a harrow, such as any of the commercially available harrows. While the spring tooth harrow is generally preferred, the present invention also contemplates the use of a spike harrow, as well as the various commercially available modifications thereof, including the "Vibra Shank" cultivators and the "Vibra Tine" harrow, the "Coil-Tine" harrow and the "Peg-Tooth" harrow. In this embodiment the harrow will be mounted in such a fashion that it will extend to approximately the same width as the reel unit and penetrate the ground surface a depth adequate to cause break-up of any large pieces of wet soil which may remain after the passage of the reel, while at the same time maintain a leveling action and improving thereon, achieved by the reel unit.

In the fourth embodiment, the seed bed finishing implement comprises a spider wheel cultivator wherein a plurality of spider wheels are mounted at an acute angle with respect to the transverse axis of the machine, whereby the spider wheels will break up large pieces of dirt and perform a leveling function. Any of the various commercially available spiked wheels, sometimes known as spider wheels or cutter wheels, may be used.

Generally it is preferred to use these wheels in groups of 4 to 6 wheels mounted on a single axle segment, although greater or lesser numbers of wheels can be mounted on a single axle segment. The axle is preferably horizontally mounted, but at an acute angle from the transverse axis of the machine, whereby the leveling action is accomplished. Preferably, the spider wheels are used in a series of groups or units which extend across the width of the machine, although a single axle extending across the width of the machine may be used. The spider wheels should be in contact with the soil, at a depth sufficient to accomplish the desired soil breakup and leveling.

Generally speaking all of the seed bed finishing implements should be wide enough to extend substantially across the width of the tiller planter machine. Usually they will be the same width as the reel unit which precedes the seed bed finishing implement. Generally the seed bed finishing implement should be mounted to permit a shallow penetration of the soil surface. As is explained below, this will permit the seed bed finishing implement to accomplish some compaction and leveling, while at the same time further pulverizing any intermediate sized soil particles. Those skilled in the art will be aware that the field conditions and soil conditions encountered will determine the optimum depth and penetration for the particular seed bed finishing implement being used.

Attached near the rear end of the main frame are the rear support wheels. Preferably the rear support wheels which are fitted with pneumatic tires, are mounted on an arm attached to a hydraulically pivotable shaft, whereby the height of the rear end of the main frame can be elevated through the use of hydraulic cylinders to pivot the shaft and adjust the elevation of the rear support wheels. In addition to adjusting the pitch attitude of the frame, and thereby the force applied to the reel and roller units, and to some extent the depth of penetration of the chisel plows, the rear support tires are used to lift the rear end of the frame, including all of the tools clear of the ground, in order to transport the apparatus across obstacles or on roads.

The rear portion of the main frame also includes a tool bar on which one or more conventional planter units are mounted. The rearmost tool bar may be rigid and fixed or it may be of the "free floating" type wherein the planter units are raised when the rear end of the frame is raised, but which will permit the tool bar and planter units attached thereto to raise if the rear end of the frame drops into a ditch or the like. The planter units may comprise a plurality of independent single row type units or may be the "air flow" multiple row-type planters which are adapted to be mounted on conventional tool bars. Preferably the planter unit can be quickly converted from planting one type of seeds to another type. Further, planter units which have a fairly large seed carrying capacity are preferred, since the large capacity seed bins require less frequent stops for refilling.

BRIEF DESCRIPTION OF THE DRAWINGS

In the detailed description which follows, reference will be made to the drawings comprised of the following figures which illustrate the four embodiments of the present invention:

FIG. 1 is a top view of the combined apparatus for tilling and planting of the first embodiment of the present invention showing a rod roller as the seed bed finishing implement;

FIG. 2 is a partial side view of the apparatus shown in FIG. 1 with a rod roller as the seed bed finishing implement;

FIG. 3 is a fragmentary isometric view of a rod roller of the type shown in FIGS. 1 and 2;

FIG. 4 is a fragmentary isometric view of a reel unit adapted to be used as the seed bed finishing implement in lieu of the rod roller shown in FIGS. 1 and 2;

FIG. 5 is a fragmentary isometric view of a spring tooth harrow adapted to be used as the seed bed finishing implement in lieu of the rod roller shown in FIGS. 1 and 2;

FIG. 6 is a fragmentary isometric view of a spike tooth harrow adapted to be used as the seed bed finishing implement in lieu of the rod roller shown in FIGS. 1 and 2;

FIG. 7 is a fragmentary isometric view of a spider wheel assembly adapted to be used as the seed bed finishing implement in lieu of the rod roller shown in FIGS. 1 and 2;

FIG. 8 is a partial top view showing the full width of one variation of the spider wheel embodiment, wherein the spider wheel is mounted on a pair of shafts with 19 wheels per shaft; and FIG. 9 is a partial top view showing the full width of another variation of the spider wheel embodiment, wherein a limited number of spider wheels are mounted in a plurality of relatively short shaft segments.

DETAILED DESCRIPTION OF THE INVENTION

Having reference particularly to FIGS. 1, 2 and 3 which illustrate the first embodiment of the present invention, a main frame, shown generally at 10, is formed from a plurality of parallel longitudinal members 11 to which a series of tool bars 12, 14 and 16 are affixed, as by welding or bolting or other securing arrangement. The number of longitudinal members used in the apparatus will be determined by the overall width of the apparatus. It is contemplated that the apparatus may plant from 4 rows to 12 rows or more, which will require an overall width of from 7 feet to 25 feet or more. Preferably, the forwardmost portion of each of the longitudinal members 11 is joined to the forward tool bar 12, hereinafter referred to as the first chisel plow tool bar 12. A second tool bar (adapted to mount the second row of chisel plows) 14, and rear tool bar 16 (adapted to mount the planter units) are secured to the longitudinal members 11, in sequence to the rear of the tool bar 12.

At the forward end of the main frame is a hitch member shown generally at 20. The embodiment shown in FIG. 1 is adapted to be used with a three-point hitch in order to obtain the required elevational adjustment. The hitch member 20 serves as a point of attachment wherein the apparatus of the present invention is attached to the prime mover for movement through the field. Hitch member 20 in combination with the three-point hitch on the tractor provides means by which the elevation of the front of main frame 10 may be adjusted during the operation of the equipment. The tongue portion of the forward hitch may have provision for rough elevational adjustment, but it is essential that during operation the tongue be rigid and held in a fixed attitude with respect to the main frame.

The forward hitch member 20 preferably comprises a Y-shaped draw bar 22, which may be conveniently welded to the bottom side of tool bar 12 and butt welded to the forward side of tool bar 14. The forward portion of the hitch member 20 is a forward tongue 24 which is equipped with fitting 26, adapted to engage a conventional three-point hitch (not shown) mounted on the rear of the tractor prime mover. In the embodiment shown in FIG. 1, it is essential that the hitch 20 comprise a draw bar 22 which is rigidly mounted to the main frame with respect to elevational movement. In this manner, when the three-point hitch mounted on the tractor is actuated, the elevation of the front portion of the main frame may be adjusted accurately and quickly to the desired operating level, i.e., the depth at which the chisel plows are set. Although it is possible to fabricate forward hitch 20 which is based on a draw bar with a single stem, the Y-shaped draw bar 22, as shown in FIG. 1, is preferred. If desired, the front hitch 20 may comprise a draw bar with three or more points of attachment 20C, 20D, 20E to the main members 10, 11, 12, and 14 of frame 10, depending upon the width of the main frame as shown in FIG. 1.

Mounted at the rear of the main frame 10 is a shaft 30 on which are mounted a plurality of rear support wheels 32. Rear support wheels 32 are mounted on arm 34 which is affixed to shaft 30, the attitude of which is determined by control arm 36 which in turn is controlled by hydraulic cylinder 38 and hydraulic piston 39. In the embodiment shown in FIG. 1, four rear support wheels 32 are mounted on shaft 30, but the actual number used will depend upon the width of the tiller planter unit.

The attitude of the arm 34 and the resultant position of rear support wheels can be controlled by a single cylinder 38, as is shown in FIG. 1, or a plurality of hydraulic cylinders, operated by a single control mechanism, can be used to control the attitude of control arm 36, which in turn controls arm 34 and the height or rear support wheels 32. As is shown in phantom in FIG. 3 of parent application Ser. No. 647,655, the hydraulic unit 38 may be used to lower the rear support wheels sufficiently to raise the rear end of the tiller planter unit completely off the ground in order to move over obstacles or travel on the road.

Mounted on forward tool bars 12 and 14 are a plurality of chisel plows 40. As is shown in FIG. 1, the chisel plows are mounted in staggered relationship with one another. Preferably the plows are in alternating relationship, as is shown in FIG. 1, but other forms of staggered relationships may be used. Plows 40 are mounted on tool bars 12 and 14 using conventional means, such as mounting bolts 42. As was mentioned above, spring mounted chisel plows are preferred, but in view of the increased cost of spring mounted plows, conventionally mounted plows may be used, particularly in soil containing little or no rocks. The chisel plows 40 are preferably fitted with interchangeable plow tips of conventional design. As is known to those skilled in the art, the configuration of the plow tip used is determined by the type of soil being plowed, the type of plowing action desired, and the moisture content of the soil at the time of the plowing. Those skilled in the art will be aware that so-called "field cultivators" may be used in place of some or all of the chisel plows. In general terms field cultivators are fabricated from ⅜ inch stock, while chisel plows are fabricated from stock of up to 1 inch or more. Provided the field conditions are appropriate, field cultivators, with any of the commercially available tips may be used in lieu of the chisel plows described herein.

Mounted to the rear of the chisel plows 40 is reel unit shown generally at 50. As is shown in FIGS. 1 and 2, the reel unit comprises central shaft or axle 52 which is surrounded by a plurality of helical blades 54, which are fashioned in a manner similar to a reel lawnmower, which blades are held in fixed relationship to each other by spacers 56 which retain blades 54 in radical position with respect to shaft 52.

The reel unit 50 is located within housing 60 on reel bearing 58 in which central shaft 52 turns. The reel housing 60 is attached to a plurality of arms 62 which are pivotally connected to the longitudinal members 11 of main frame 10 through bracket 66 and pin 64. When so mounted, reel unit 50 is urged downwardly by one or more springs 68. The downward movement of reel unit 50 is limited by limiting member 69, which may take the form of a chain, a cable, or an adjustable bar. The springs and the amount of thrust applied thereby which urges the reel units and the roller units downwardly, may be varied according to soil conditions and the particular configuration of reel and roller used. However, for the six row units described in the drawings, it has been found that good results are obtained using four auto coil springs on each of these units. Although it is possible to use the reel in a fixed relationship to the frame, the floating type of mounting described above is preferred.

Mounted to the rear of reel unit 50 is the seed bed finishing implement. FIGS. 1 and 2 illustrate the first embodiment, wherein the seed bed finishing implement is a rod roller shown generally at 170. The rod roller 170 comprises a central shaft 174 which rotates in bearing 176 within roller housing 178. The roller housing 178 is connected to arms 80 which are pivotally attached to longitudinal members 11 of main frame 10 through pin 82 as a bracket 84. The roller unit 170 is urged downwardly by one or more springs 86, but the downward movement of the rod roller is limited by limiting means 88, which may comprise a chain, a cable, or an adjustable rod means.

The rod roller proper is formed from a series of rods 171 which are helically positioned about shaft 174 (the central shaft), and which are held in place by circular support members 172 at each end and at intermediate locations along central shaft 174. As can be seen in FIGS. 2 and 3, it is preferred that the circular support members 172 be provided with a plurality of openings 175 adapted and engage rods 171. It has been found that a roller approximately 18 inches in diameter can conveniently function with up to 24 rods spaced about the periphery of support members 172. In many cases adequate soil compaction may be attained with the use of only 12 or fewer rods, the exact number being determined upon the particular soil and field conditions encountered during the time of use. It is therefore most preferred that at least half of the rods 171 be permanently affixed to the circular support members 172, such as by welding, but that the balance of the rods be removably attached to the circular support members 172 in order that the number of rods and the spacing of the rods can be changed. While it is possible to use a rod roller wherein all of the rods are removable, it is generally preferred that at least one-fourth of the rods be permanently affixed to the circular support members 172.

Preferably, a plurality of liquid fertilizer injection knives 90 are mounted on the forward portion of roller housing 178. The knives 90 may be conventional knives designed for injecting anhydrous ammonia fertilizer into the soil. Knives 90 are preferably mounted on the roller housing 178 with pivot means 92, whereby the knives can be pivoted to a non-operative position when planting crops which do not require liquid fertilizer. It is also desired that the pivot means 92 be vertically adjustable in order to control the depth at which the anhydrous fertilizer is injected. Since the knives 90 are mounted on rod roller housing 178, their depth of penetration is fixed with relation to the level of the seed bed finishing implement 170, which determines the level of the soil for the seed bed. As is explained below, it is necessary to space the injection knives 90 between the planter units 100, in order to inject the anhydrous fertilizer between the seed rows.

Optionally, mounted on the rear portion of rod roller housing 178 are a plurality of disc hillers 94 for the purpose of forming furrows in the prepared seed bed. Preferably the disc hillers 94 are pivotally mounted at 96 in a manner which enables the hiller to be readily placed in a non-operative position. Alternatively, the disc hillers 94 may be mounted in a manner which will facilitate their easy removal and replacement. The disc hillers may be arranged to form furrows, or alternatively, hills upon which the seeds are sown, depending upon the type of crop and desires of the farmer.

The planter units are shown generally at 100. The planter units 100 are rigidly mounted to tool bar 16 on the rear end of main frame 10. When the rear support wheels 32 are lowered, the rear end of main frame 10 is raised, thereby raising planter unit off the ground. The planter units may comprise one or more conventional planters, as is shown in FIG. 1 or, as is mentioned above, a single multiple row planter unit may be employed. Generally speaking, the planter units comprise the soil opener (not shown) a seed bin 104 with a mechanism to drop seeds at a selected rate into the opened soil (not shown) which is then followed by the seed press wheel 106, which carries out the function of covering the seed with soil and pressing the soil over the seed.

The planter units used in the present invention are preferably driven through contact of the seed press wheel 106 with the ground. In other words, as the planting unit moves through the field, seed press wheel 106 rotates, which operates the mechanism which drops the seed from bin 104 into the ground. When this preferred embodiment is employed the planter unit 100 discontinues the dropping of seed into the ground, when the planter unit 100 is raised above ground level.

As was mentioned above and as is more clearly shown in FIG. 1, the planter units 100 are located in intervals between the anhydrous injection knives 90 so that the seeds being planted by the planter unit will not be planted immediately on top of the freshly injected nitrogen or other liquid fertilizers.

The second embodiment to the present invention contemplates the use of a second reel as the seed bed finishing implement, i.e., in lieu of the rod roller 170 shown in FIGS. 1 and 2. The reel used as the seed finishing implement may be of the same size, shape, and mounting configuration as is the first reel 60 shown in FIG. 2. Alternatively, as is shown in FIG. 4, the reel 270 may be of a slightly smaller diameter mounted in a housing 278. Generally the reel comprises a plurality of blades 271 which are positioned parallel to and helically disposed about central shaft 274, which is mounted at its end in bearing member 276 affixed to housing 278. In the second embodiment the reel 270 is adapted to further pulverize and further level the seed bed, while at the same time providing some compaction thereof. To this end, the size of the second reel may be smaller than that of the first reel.

The present invention contemplates that the reel as used in the second embodiment may be mounted on central shaft member 274 which is essentially the same diameter, length as the central shaft 174 of the rod roller 170 shown in FIG. 3, whereby the two units may be interchanged by changing mounting bracket 276 and 176, or alternatively, replacing the rod roller 170 with the reel unit 270 by inserting shaft 274 in lieu of shaft 174. Such a substitution would not ordinarily be practical while the unit is in use in the field, but it could be readily accomplished by many farms in the farm yard or machinery shed wherein suitable equipment is available to interchange the implements.

The third embodiment of the present invention comprises a harrow as the seed bed finishing implement. As is shown in FIGS. 5 and 6, either spring tooth harrows 371 or spike tooth harrows 375 may be mounted on a frame 378 and used as the seed bed finishing implement.

As is shown in FIG. 5, the harrow is mounted in housing 378, irrespective of whether it is a spring tooth harrow or a spike tooth harrow. Frame 378 is adatped to be mounted on main frame 10 through arm 80, more fully shown in FIG. 2. As is shown in FIG. 5, spring tooth harrow members 371 may be arranged in a plurality of rows, in staggered relationship to one another. The rows may be mounted on a non-rotating shaft 372 which is affixed to bracket 373 depending from frame 378. It is generally preferred that non-rotating shaft 372 be of square or rectnagular cross section in order to maintain the proper attitude of the spring tooth harrow members 371.

FIG. 6 illustrates mounting of spike tooth harrows 375. FIG. 6 illustrates the use of a harrow on a single mounting means 376 wherein the harrow is mounted on bracket 376 by rotatable shaft 374, whereby the attitude of harrow members shift in accordance with the lay of the land.

It is contemplated that spring tooth harrow may be mounted in a similar type arrangement.

The fourth embodiment of the present invention comprises a row of spider wheels as the seed bed finishing implement. FIG. 7 shows a row of 4 spider wheels 471 mounted on central shaft 474. Shaft 474 is mounted in rotating relationship to bearing member 476 which in turn is affixed to housing 478 which is mounted to main frame 10 by arm 80, as is more clearly seen in FIG. 2. The exact configuration of the spider wheels is not critical and any of the commercially available variations including those known as rotary hoes may be used. The preferred style of spider wheel is illustrated in FIG. 7.

FIG. 8 illustrates one variation of the fourth embodiment, wherein the seed bed finishing implement comprises a row of spider wheels mounted on a pair of shafts each of which extends approximately half the width of the tiller planter and each of which is mounted at acute angle to the transverse axis of the machine. It is contemplated that the acute angle mounting is necessary in order to achieve leveling function, as well as the ability of subdivide soil particles.

FIG. 9 illustrates another embodiment variation of the fourth embodiment wherein the row of spider wheels is comprised of a series of shaft sections, approximately 8 wheels to each shaft section and mounted wherein each shaft section is at an acute angle to the transverse axis of the machine. Again the shaft segments may be positioned parallel to one another as is shown in FIG. 9, or at complementary angles to one another as is shown in FIG. 8. The embodiment shown in FIG. 9 requires more bearings and is, in general, more complex to produce, but is advantageous in that the spider wheels require less longitudinal space within the tiller planter. The extent of the angle will determine, in some measure, the amount of leveling which is accomplished by the spider wheels.

When the tiller planter unit of the present invention is to be used with a prime mover tractor which has a stationary draw bar attachment, i.e., it does not have a conventional three-point hitch which permits elevational adjustment of the hitch from the tractor cab, the tiller planter unit must be provided with means to adjust the elevation of the front end. A suitable means for hydraulically adjusting the front end of the tiller planter is shown in FIG. 4 of parent application Ser. No. 647,655. As is shown in FIG. 4 of the parent application, the draw bar hitch 110 is pivotally attached to tool bar 14 using bracket 112 and pivot pin 114. The elevational adjustment of draw bar 110 is controlled by hydraulic cylinder 116 which is pivotally attached to tool bar 12 or to another portion of the main frame 10. Hydraulic piston 118 is pivotally attached to the forward portion of draw bar 110 whereby the pitch of draw bar 110 can be regulated with respect to the attitude of main frame 10. Draw bar 110 is pivotally connected to tractor hitch 120. Thus, by controlling the amount of hydraulic fluid applied to hydraulic cylinder 116, the elevation of the forward end of the frame 10 can be controlled from the tractor cab.

The present invention contemplates that the tiller planter unit of the present invention may be equipped with one or more tanks (not shown) which serve as liquid fertilizer tanks. Such tanks may be connected to liquid fertilizer injector knives 90 and controlled from the cab of the tractor, whereby the liquid nitrogen is continuously injected into the soil through knives 90 during the planting operation, but is discontinued when the planter tillage unit is raised by actuating rear support wheels 32. In an additional embodiment, a tank located on the upper side of main frame 10 may be used to hold herbicides. The herbicides may be applied following the planting operation through nozzle 132. Alternatively, the herbicides can be applied ahead of the roller assembly 70 or ahead of the chisel plows 40, depending upon the type of herbicide and the type of seed being planted.

Alternatively, in lieu of tanks mounted on main frame 10, the liquid fertilizer or herbicide may be placed in one or more towed tank wagons, not shown, and pulled behind the tiller planter.

The tiller planter of the present invention may be made in a six row unit, as is illustrated in the drawings, or it may be made in a wider or narrower unit. For instance, units which plant from 10 to 12 rows are contemplated. It has been found that the six row unit shown in the drawings will plant from 60 to 80 acres per day operating at from 4 to 7 miles per hour, when such crops as soybeans or corn are planted using 20 inch rows. Using conventional techniques, about 2½ days would be required to plant such an acerage. It is found desirable to operate the unit at from 4 to 7 miles per hour. If the unit is moved too slowly through the field, the reel unit will not pulverize the dirt properly and an uneven seed bed is obtained. In addition to the obvious savings of time, accomplishing the tilling and planting in a single pass through the field saves at least 50% of the required fuel.

The tiller planter unit of the present invention provides flexibility which is essential to successful operation. For instance, when the unit is pulled through a transverse drainage ditch, the front portion of the main frame is raised in order to lift the chisel plows above the ground level and thereby avoid filling the drainage ditch with soil and trash. Although the plows have been lifted, the rear portion of the main frame is desirably left at its operating height, whereby the unit continues the planting and fertilization of the ditch. Since the soil leveling and pulverizing unit and the seed bed finishing implement are preferably mounted on independently moving arms, both of these units remain in contact with the soil, and break up the soil sufficiently to permit planting of the seed. Since crops are thereby actually planted in the ditch, errosion of the drainage ditch is minimized.

The present invention also contemplates the application of broadcast chemicals for weed control in addition to the liquid herbicides described above. For instance, the broadcast type of pre-emerging weed control chemicals, some of which must be worked into the soil, can be applied ahead of the plow units. In such a case, the chemicals are plowed, subjected to operations by both the soil leveling and pulverizing units and seed bed finishing implement in order to thoroughly work the chemicals into the soil. Application of the herbicides in the same operation as the tilling and planting is advantageous, in that there are no tractor tracks in the prepared seed beds. Packing of seed beds by the tractor wheels has a tendency to produce a high incident of weeds, which require further cultivation and/or herbicide application. The single pass planting avoids this problem.

The forms of invention herein shown and described are to be considered only as illustrative. It will be apparent to those skilled in the art that numerous modifications may be made therein without departure from the spirit of the invention or the scope of the appended claims.

I claim:

1. A machine for tilling and planting the surface of a field comprising:
   a frame adapted for movement across a field, said frame adapted to be drawn by a prime mover tractor, the longitudinal attitude of said frame being adjustable from said tractor, whereby the operator of said tractor can independently adjust both the elevation of the front of said frame and the elevation of the rear of said frame;
   a plow unit mounted below the forward portion of said frame, said plow unit comprising a plurality of chisel plows adapted to plow the soil as said frame is moved through the field;
   a reel unit flexibly mounted below said frame, to the rear of said plow unit, said reel unit extending substantially the width of said plow unit, adapted to rotate as said frame is pulled through the field and thereby pulverize the soil, said reel unit being biased downwardly but being limited as to downward movement and as to depth of soil penetration;
   a seed bed finishing implement flexibly mounted below said frame to the rear of said reel unit, said seed bed finishing implement extending substantially the width of said plow unit, and adapted to finish the soil to prepare a seed bed as said frame is pulled through the field; and a seed planting unit rigidly mounted on the rear of said main frame whereby the seed planting unit is raised from the ground when the rear of the main frame is elevated, said seed planting unit adapted to plant a plurality of rows of seeds as said frame is pulled through the field.

2. A machine as described in claim 1 wherein said seed bed finishing implement is a horizontally disposed rod roller.

3. A machine as described in claim 2 wherein said rod roller comprises a central shaft member, a plurality of circular spacing members positioned along said central shaft member, and a plurality of rods which are helically positioned with respect to said central shaft member, and held in such helical position by said circular spacing members.

4. A machine as described in claim 3 wherein a plurality of said rods are permanently attached to said circular support members.

5. A machine as described in claim 3 wherein at least half of said rods are permanently attached to said circular support members.

6. A machine as described in claim 3 wherein up to half of the rods are removable from the support members.

7. A machine as described in claim 1 wherein said seed bed finishing implement is a reel.

8. A machine as described in claim 7 wherein said seed bed finishing reel is approximately the same size, configuration, and mounting as the first defined reel unit.

9. A machine as described in claim 1 wherein said seed bed finishing implement is a harrow.

10. A machine as described in claim 9 wherein said harrow is a spring tooth harrow.

11. A machine as defined in claim 9 wherein the harrow is a spike tooth harrow.

12. A machine as described in claim 1 wherein said seed bed finishing implement is a row of spider wheels, mounted on a central axle adapted to rotate, said axle being horizontally disposed and mounted at an acute angle to the transverse axis of said frame.

13. A machine as described in claim 1 wherein said steel bed finishing implement comprises a plurality of spider wheels wherein said spider wheels are mounted on a plurality of shaft segments, each segment of which is mounted on an acute axis to the transverse axis of said frame.

14. A machine as described in claim 13 wherein all shaft segments are positioned parallel to one another.

15. A machine as described in claim 12 wherein each shaft segment contains from 4 to 8 spider wheels.

* * * * *